United States Patent
Myers (10) Patent No.: US 9,714,856 B2
(45) Date of Patent: Jul. 25, 2017

(54) AUTOMATIC COMPENSATION FOR THE EFFECT OF GRAIN PROPERTIES ON MASS FLOW SENSOR CALIBRATION

(71) Applicant: Ag Leader Technology, Ames, IA (US)

(72) Inventor: Al Myers, Ames, IA (US)

(73) Assignee: Ag Leader Technology, Inc., Ames, IA (US)

(*) Notice: Subject to any disclaimer, the term of this patent is extended or adjusted under 35 U.S.C. 154(b) by 126 days.

(21) Appl. No.: 14/564,539

(22) Filed: Dec. 9, 2014

(65) Prior Publication Data
US 2015/0168187 A1 Jun. 18, 2015

Related U.S. Application Data (60) Provisional application No. 61/915,933, filed on Dec. 13, 2013.

(51) Int. Cl.
| | | |
|---|---|---|
| *G01F 1/20* | (2006.01) | |
| *A01C 7/10* | (2006.01) | |
| *G01F 1/80* | (2006.01) | |
| *A01D 41/127* | (2006.01) | |
| *G01F 25/00* | (2006.01) | |
| *G01F 1/30* | (2006.01) | |

(52) U.S. Cl.
CPC ............ *G01F 1/80* (2013.01); *A01D 41/1272* (2013.01); *G01F 1/30* (2013.01); *G01F 25/0007* (2013.01); *A01D 41/1277* (2013.01)

(58) Field of Classification Search
CPC ......... A01D 41/1272; G01F 1/30; G01F 1/80; G01F 25/0007
See application file for complete search history.

(56) References Cited

U.S. PATENT DOCUMENTS

| | | | |
|---|---|---|---|
| 5,343,761 A | 9/1994 | Myers | |
| 5,369,603 A | 11/1994 | Myers | |
| 5,837,906 A * | 11/1998 | Palmer | G01F 1/66 73/861.73 |
| 6,285,198 B1 | 9/2001 | Nelson et al. | |
| 2001/0054903 A1* | 12/2001 | Adams | G01F 1/64 324/667 |
| 2004/0050138 A1* | 3/2004 | Beck | G01F 25/0007 73/1.16 |
| 2007/0089389 A1* | 4/2007 | Baumgarten | A01D 41/1276 56/10.2 A |

(Continued)

OTHER PUBLICATIONS

Derwent, Grain storage and drying unit has computerized system to monitor moisture and control heater ventilator, Apr. 7, 1991, Thomas Reuters, SU 1639479 A.*

*Primary Examiner* — Francis Gray
(74) *Attorney, Agent, or Firm* — McKee, Voorhees & Sease, PLC (57) ABSTRACT

A yield monitor system is configured to determine how the calibration characteristics of a grain mass flow sensor on an individual combine are affected by grain moisture content and/or other grain parameters which can be measured instantaneously or periodically by the yield monitor system or its operator, or which can be observed by the operator, or which can be determined from other reference information, such as maps of where different grain varieties or hybrids were planted. Other systems, methods, and apparatuses are also provided.

29 Claims, 8 Drawing Sheets

(56) References Cited

U.S. PATENT DOCUMENTS

2013/0080079 A1\* 3/2013 Dankowicz ............... G01F 1/30
　　　　　　　　　　　　　　　　　　　　702/45
2015/0377690 A1\* 12/2015 Phelan ................ G01F 25/0046
　　　　　　　　　　　　　　　　　　　　73/1.34

\* cited by examiner

AUTOMATIC COMPENSATION FOR THE EFFECT OF GRAIN PROPERTIES ON MASS FLOW SENSOR CALIBRATION

PRIORITY STATEMENT

This application claims priority under 35 U.S.C. §119 to provisional application U.S. Ser. No. 61/915,933 filed Dec. 13, 2013, hereby incorporated by reference in its entirety.

FIELD OF THE INVENTION

The present invention relates to methods, systems, and apparatus for calibrating a mass flow rate measuring system which is used to continuously measure grain mass flow rate in a harvester as grain is harvested.

BACKGROUND OF THE INVENTION

Grain mass flow sensors have become widely used on grain combines to measure and record instantaneous crop yield values, and to compute load, field and farm totals, as grain is harvested. An example of such a system is shown in U.S. Pat. No. 5,343,761, herein incorporated by reference in its entirety.

Although the accuracy of such systems has been good enough allow combine yield monitors to become widely used, farmers and their advisers who analyze their yield data request better accuracy and less effort required to calibrate such systems during field operation. It is known that variable properties of the grain being harvested, such as grain moisture, grain density, kernel size, kernel shape or kernel frictional characteristics can affect the accuracy of grain mass flow measurement, and thus grain yield measurement. The system shown in U.S. Pat. No. 5,343,761 describes the use of two calibration curves (FIG. 6B), one at each of two different grain moisture levels, to allow accurately measuring grain mass flow rate at different moisture levels. Since current yield monitor systems include a real-time grain moisture sensor, it is possible to use the instantaneously measured grain moisture value with the instantaneously measured force on the impact plate, to calculate an accurate instantaneous mass flow rate, by interpolating between, or extrapolating outside, the two calibration curves, each of which is for a specific grain moisture level.

In actual practice, a simpler method of compensating the mass flow sensor's calibration characteristic for grain moisture has been implemented where the curve is either moved or scaled up or down (left or right would also be functionally similar), as in FIG. 6B of U.S. Pat. No. 5,343,761, in relationship to grain moisture. For example, the calibration curve values might be shifted 0.5% for every 1% change in grain moisture from a reference moisture value.

However, there are several problems with the prior art. The first is that dimensional variations in the clean grain elevator housing, chain sprocket and chain paddles from one combine to another, even of the same manufacturer's model, affect the degree to which the calibration curve shifts relative to grain moisture. The second is that the calibration curve does not shift the same amount at all grain flow rates, and the amount that it shifts at different grain flow rates is dependent on an individual combine's elevator component dimensions. The third is that the curve may shift up or down (or alternatively left or right) at different flow rates, and this is also dependent on an individual combine's elevator component dimensions. These problems make it impractical to have highly accurate pre-determined calibration curves, because it is not practical to determine calibration curves for all possible dimensional variations that occur in the components of a combine clean grain elevator.

In addition to these problems it is also known that grain density has an effect on the calibration characteristic of the mass flow sensor. It is further known that grain kernel size or shape can have an effect on the calibration characteristic of the mass flow sensor. It is also known that the frictional characteristics of grain resulting from harvesting conditions, such as air humidity or sticky residue from grain stems; grain maturity, such as grain that is frozen by cold ambient temperatures prior to biological maturity; or differences in grain varieties or hybrids; can have an effect on the calibration characteristic of the grain mass flow sensor.

The method of determining the calibration characteristic of a grain mass flow sensor that is shown in U.S. Pat. No. 5,369,603 (hereby incorporated by reference in its entirety) teaches a method for determining the nonlinear calibration characteristic of a grain mass flow sensor by minimizing the differences between the masses of multiple grain loads, as measured by the grain yield monitor system versus the masses of the same grain loads determined by means external to the combine, such as weighing the loads individually in a grain transport vehicle such as a truck or wagon. This method does a good job of determining the calibration characteristics of the mass flow sensor at different grain flow rates, but does not consider the effect of grain moisture or other grain parameters on the calibration characteristic. Calibration characteristics determined with loads having significantly different moistures or other grain parameters are not accurate for all moistures or grain parameters.

Therefore, despite various attempts at mass flow calibration, problems remain. What is needed is an improved method to compensate for the effects of grain properties on mass flow sensor calibration which may be used in a yield monitor system.

SUMMARY OF THE INVENTION

Therefore, it is a primary, object, feature, or advantage of the present invention to improve over the state of the art.

It is a further object, feature, or advantage of the present invention to provide a yield monitor system which can determine how the calibration characteristics of a grain mass flow sensor on an individual combine are affected by grain moisture content and/or other grain parameters which can be measured instantaneously or periodically by the yield monitor system or its operator, or which can be observed by the operator, or which can be determined from other reference information, such as maps of where different grain varieties or hybrids were planted.

It is another, object, feature, or advantage of the present invention to provide a system which determines how the calibration characteristic of the grain mass flow sensor varies as a function of the available grain parameters (moisture, density, etc.), by determining calibration curve variation coefficients which determine how a baseline calibration curve varies as a function of a measured or input grain property value, by minimizing the variation between the masses of multiple grain loads, as measured by the grain yield monitor system versus weighed individually in a hauling vehicle after unloading the grain loads from the combine, or by a weighing system built into the combine, such as strain gauges on structural members of the combine.

It is yet another object, feature, or advantage of the present invention to provide a system which enhances a mass flow sensor calibration system which determines values of the mass flow calibration curve at a limited number of discrete points on the calibration curve.

Although various objects, features, or advantages are described above, it is to be understood that no single embodiment need include all or any of these objects, features, or advantages. It is further contemplated that different embodiments may have different objects, features, or advantages. Thus, the present invention is not to be limited by or to these objects, features, or advantages.

According to one aspect, a yield monitor system is configured to determine how the calibration characteristics of a grain mass flow sensor on an individual combine are affected by grain moisture content and/or other grain parameters which can be measured instantaneously or periodically by the yield monitor system or its operator, or which can be observed by the operator, or which can be determined from other reference information, such as maps of where different grain varieties or hybrids were planted.

According to another aspect, a system is configured to determine how the calibration characteristic of the grain mass flow sensor varies as a function of the available grain parameters (such as, but not limited to moisture, density, kernel size, kernel shape or kernel frictional characteristics), by determining calibration curve variation coefficients which determine how a baseline calibration curve varies as a function of a measured or input grain property value, by minimizing the variation between the masses of multiple grain loads, as measured by the grain yield monitor system versus weighed individually in a hauling vehicle after unloading the grain loads from the combine, or by a weighing system built into the combine, such as strain gauges on structural members of the combine.

According to another aspect, a system is provided which enhances a mass flow sensor calibration system and which is configured to determine values of the mass flow calibration curve at a limited number of discrete points on the calibration curve.

According to another aspect, a grain yield monitor system includes a grain mass flow sensor and an intelligent control operatively connected to the grain mass flow sensor. The intelligent control is configured to calibrate the grain mass flow sensor by determining values for a mass flow calibration curve and calibrating the grain mass flow sensor with the mass flow calibration curve. The values may each include a baseline value for a fixed reference level of grain moisture and a moisture compensation value. The moisture compensation value may be proportional to a difference in a measured grain moisture level from the fixed reference level of grain moisture.

DETAILED DESCRIPTION OF THE PREFERRED EMBODIMENTS

Figure 1:
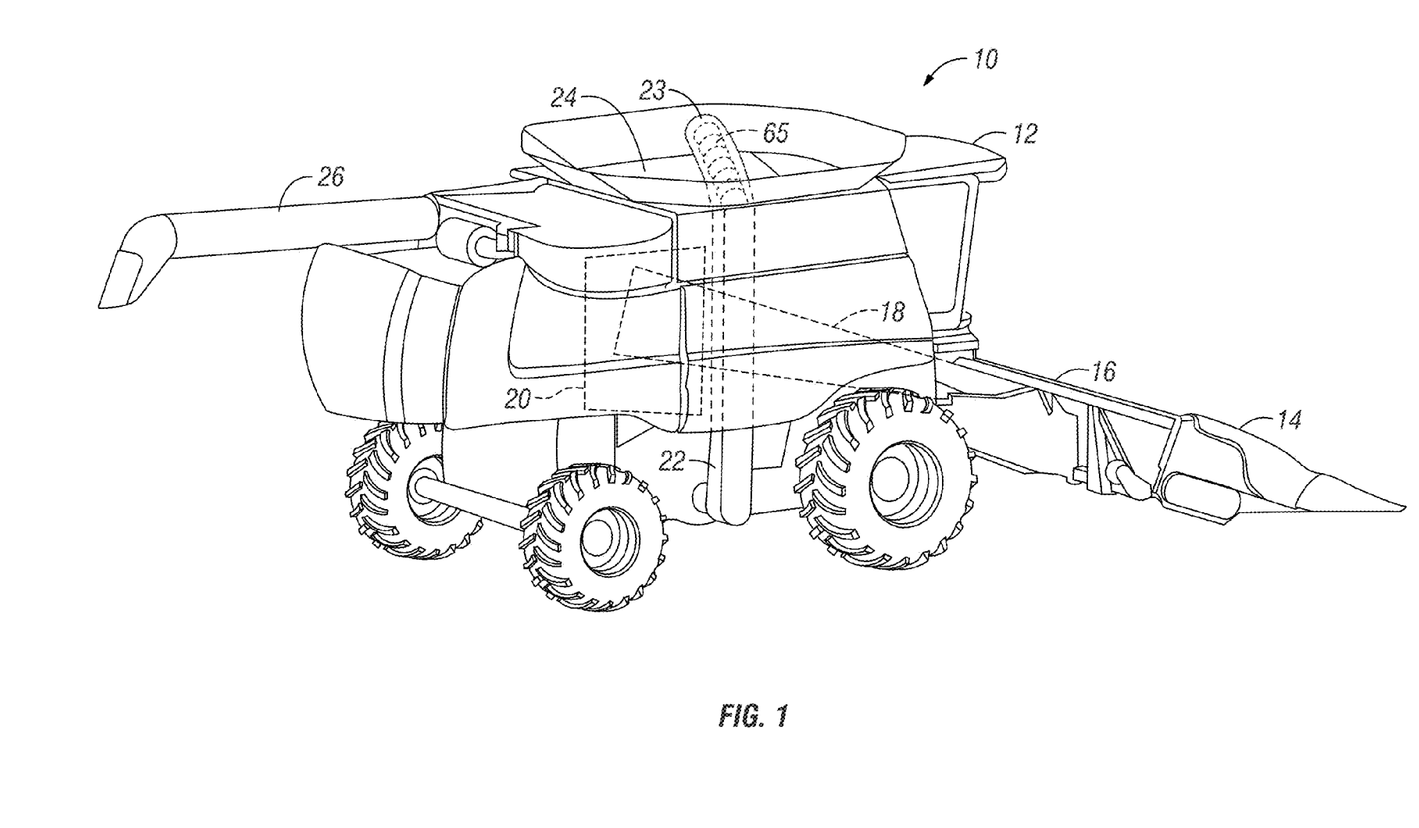
FIG. 1 illustrates one example of a combine equipped with the yield monitoring system of the present invention.

The present invention relates to yield monitoring and to calibration of a mass flow sensor in a yield monitoring system. FIG. 1 is a perspective view of one example of a harvesting machine or harvester in the form of a combine harvester or combine 10 which is equipped with a yield monitoring system. The combine harvester 10 includes a self-propelled vehicle 12 with an attached harvesting head 14 which is supported on a feeder house 16 at the front of the vehicle 12. A threshing system 18 is disposed within the combine harvester 10. The threshing system threshes crop material and conveys the threshed crop material to a cleaning and separating system 20. During a cleaning and separating process, grain falls to the bottom of the combine harvester and is then conveyed upward by a grain elevator 22 and through an auger 65 within an auger housing 23 to a grain tank 24. Grain may be stored in the grain tank 24 and later unloaded through an unloading conveyor or auger 26.

Figure 2:
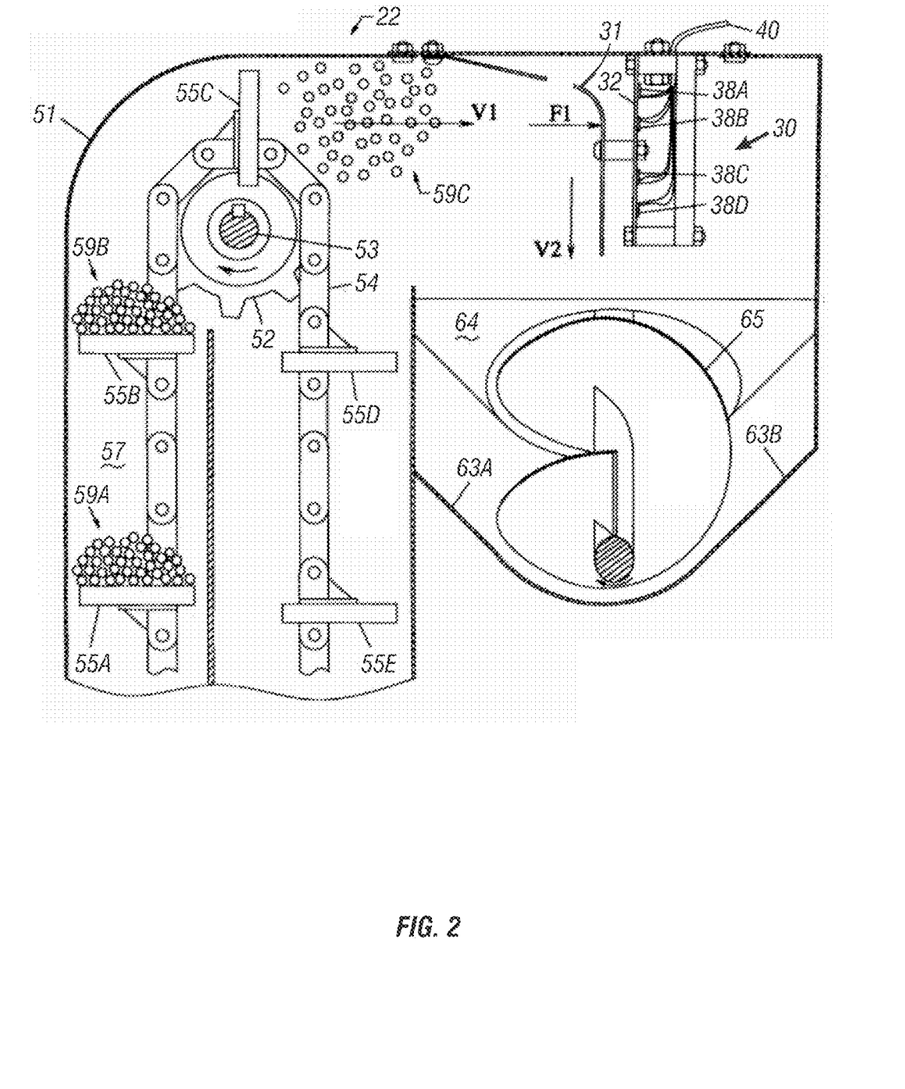
FIG. 2 illustrates is a vertical cross section through the upper or outlet end of the clean grain elevator of a harvester, with a grain mass flow rate sensor installed in a grain collection area near the outlet of the elevator.

FIG. 2 is a vertical cross section through the upper or outlet end of the clean grain elevator of a typical harvester, with a grain mass flow rate sensor installed in a grain collection area near the outlet of the elevator. As shown in FIG. 2, a grain mass flow rate sensor generally designated as 30 is positioned at the outlet of a clean grain elevator, generally designated at 22, of a harvester. Clean grain elevator 22 includes an elevator housing 51 and a chain sprocket 52 which rotates with a shaft 53 to drive a conveyor paddle chain 54, which wraps around the sprocket 52 and to which are attached paddles 55A-55E for lifting grain from the inlet or lower end of clean grain elevator 22 to the outlet or upper end of clean grain elevator 22. Sprocket 52 rotates clockwise as viewed, causing paddles 55A-55E to lift quantities of grain such as 59A and 59B upward within a compartment 57. When a link of the chain 54 to which a paddle such as 55C is connected contacts sprocket 52, the chain link and attached paddle travel in a circular arc about shaft 53, imparting generally horizontal motion to a quantity of grain such as 59C, causing grain to exit clean grain elevator 22 into collection area 64. Collection area 64 includes sloped lower surfaces 63A and 63B which cause grain to collect around grain storage tank loading auger 65, which is a screw type auger which conveys grain from collection area 64 into the grain storage tank of the harvester.

Grain mass flow rate sensor 30 includes an impact plate 31 which is attached to load beam 32, to which four strain gauges 38A-38D are bonded. Cable 40 contains electrical conductors which connect said strain gauges to remote signal conditioning circuitry. Although a type of force impact sensor is shown, it is contemplated that the grain mass flow rate sensor 30 may be of any number of alternative designs or may use a different type of technology.

A quantity of grain such as 59C initially travels with generally horizontal velocity V1 toward impact plate 31. Upon striking impact plate 31, the horizontal motion of quantity of grain 59C is stopped and the grain subsequently fails into collection area 64 with final velocity V2, which is generally vertical. The change in the horizontal component of velocity of quantity of grain 59C from V1 to substantially zero corresponds to a change in horizontal momentum of this quantity of grain which is proportional to both the mass of quantity of grain 59C and initial velocity V1. A force F1, which is proportional to the change of momentum of quantity of grain 59C, is created on impact plate 31 and is measured by load beam 32.

Figure 3:
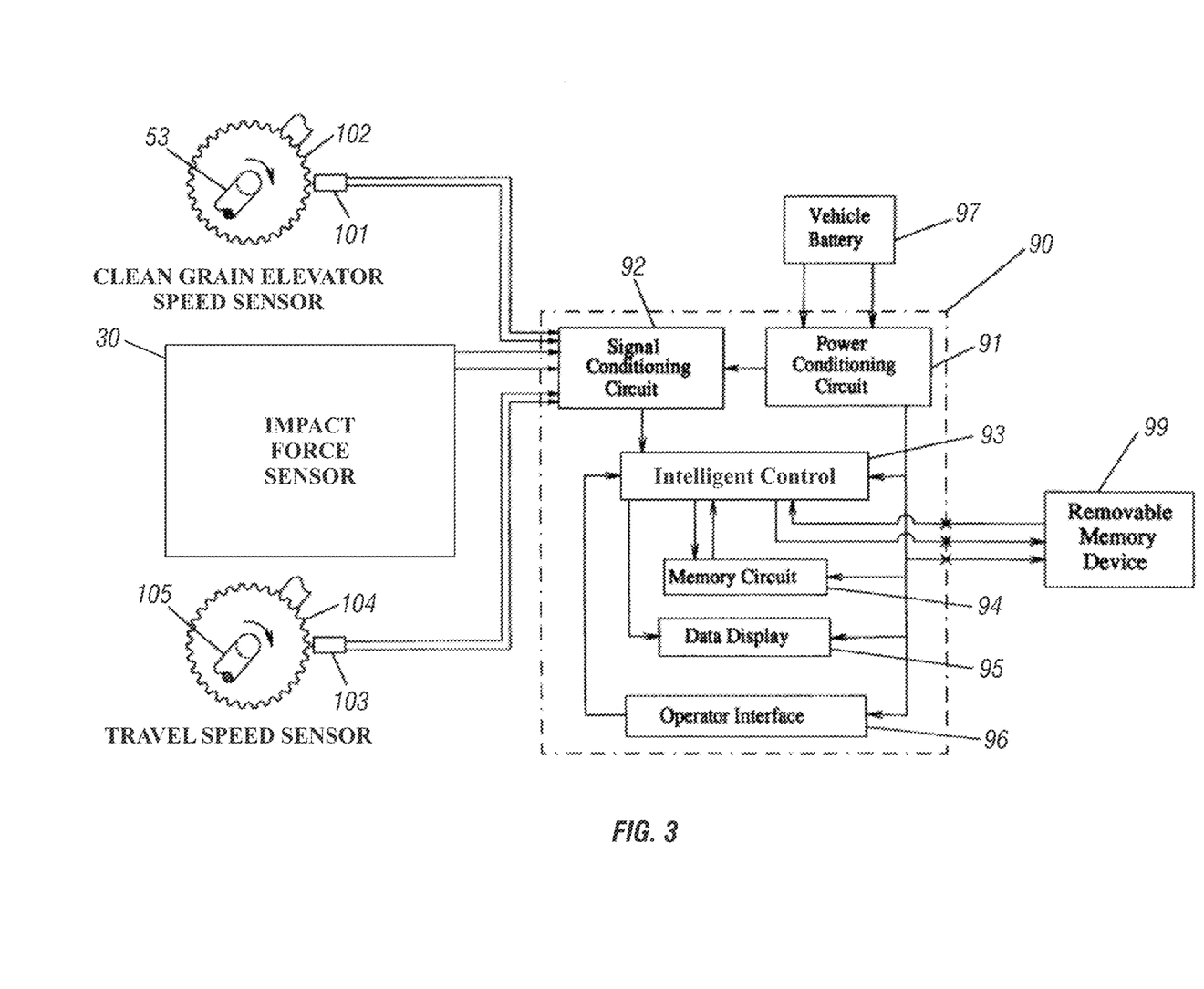
FIG. 3 illustrates one example of a system which provides for grain mass flow measuring.

Referring now to FIG. 3, a diagram of a grain mass flow measuring system is shown. An electronic monitor, generally indicated as 90, includes a power conditioning circuit 91, a signal conditioning circuit 92, an intelligent control 93 which may comprise a processor, microcontroller or other control circuit, a memory circuit 94, a data display 95 and an operator interface 96. Signal conditioning circuit 92 includes excitation and sensing means for an impact force sensor 30 (such as a strain gauge bridge) and a pair of shaft speed sensors 101 and 103. The system of FIG. 3 also includes a pair of toothed wheels 102 and 104, which are used in cooperation with the corresponding speed sensors 101 and 103 to measure the actual speeds of the clean grain elevator shaft 53 and of the shaft 105 which rotates at a speed proportional to travel speed of the harvester.

Power conditioning circuit 91 is supplied with electrical power from the electrical system battery 97 of the harvester. This power conditioning circuit protects the remaining circuitry of electronic monitor 70 from harmful transients and supplies one or more regulated constant voltages which are required by the other circuits. The impact force sensor 30 may be used to sense impact force such as by using an arrangement of strain gauges. Signal conditioning circuit 92 may be used to amplify and/or filter input from the impact force sensor 30 and to then output a signal to the intelligent control 93.

The signal conditioning circuit 92 may also be used to amplify and/or filter signals from the speed sensors 101, 103. The speed sensors 101, 103 may be pulse type speed sensors which may provide alternating voltage signals with frequencies proportional to the speeds of rotation of the respective shafts 53 and 105.

The particular circuitry needed to interface the intelligent control with the impact force sensor 30 and the speed sensors 101, 103 is dependent upon the type of sensors used. In some embodiments such circuitry may be contained within the sensor and thus additional signal conditioning would not be needed.

The intelligent control 93 may be a microprocessor, microcontroller, or other form of control circuit. The intelligent control 93 may perform calculations of data based on the signals received from the signal conditioning circuit 92 or otherwise. This information may be stored such as in the memory circuit 94 or a removable memory device 99. Information may also be displayed to a harvest operator on a data display 95. The intelligent control 93 may be configured through programming or otherwise to enhance mass flow sensor calibration as will be explained in greater detail.

An operator interface 96 may include manual inputs such as keys, buttons, or switches which allow the harvester operator to perform functions such as selecting the type of data to be displayed on data display 95, entering calibration parameters, and managing the data stored in memory circuit 94. The manual inputs may be integrated into the display such as in the form of a touch screen display with an onscreen keyboard.

A removable memory device 99 can be removed from monitor 90, which is mounted on the harvester, and transported to a remote location for reading yield and area data which is stored in the memory device. The removable memory device 99 may be a USB device, memory card or other type of removable memory.

Figure 4:
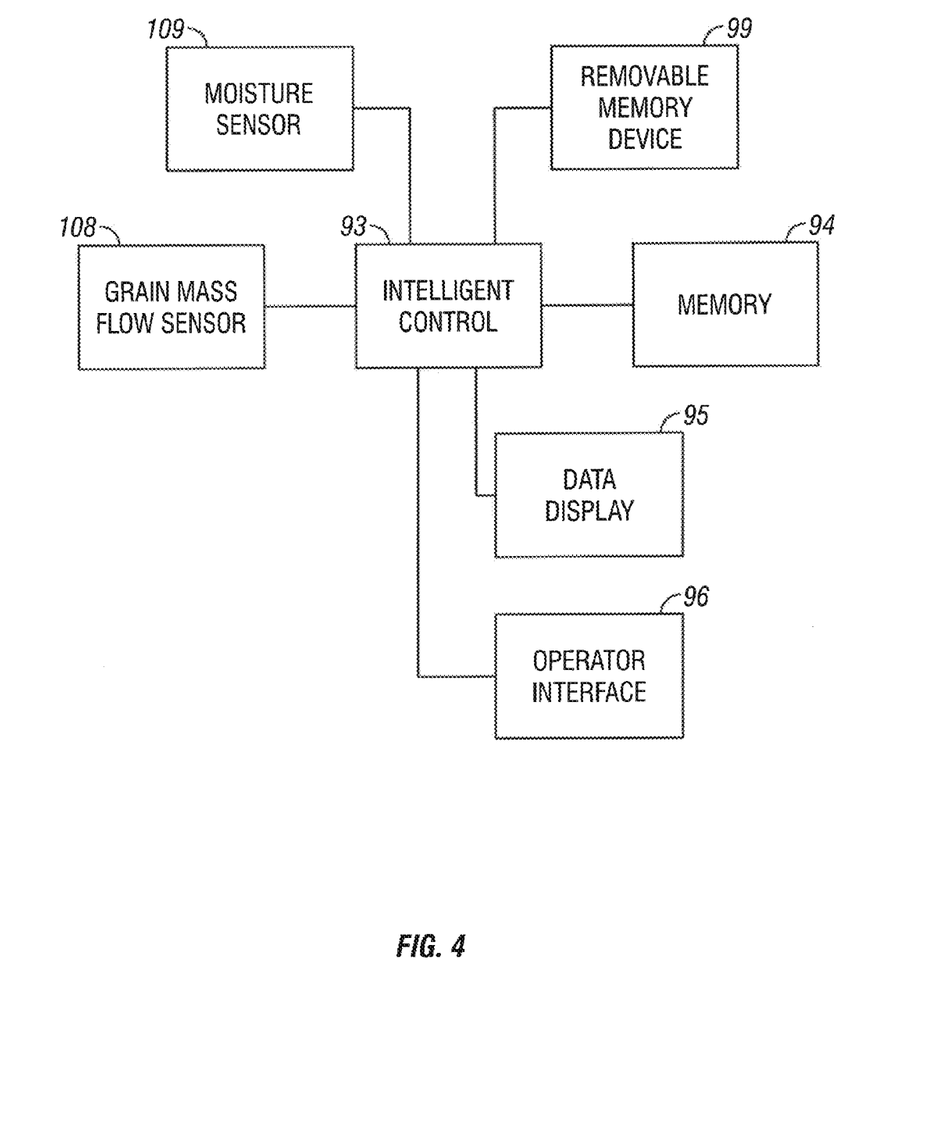
FIG. 4 is a block diagram of a yield monitoring system.

FIG. 4 illustrates another embodiment of a yield monitoring system. As shown in FIG. 4 there is an intelligent control 93 which is operatively connected to a grain mass flow sensor 108 and a moisture sensor 109. The intelligent control 93 is also operatively connected to a removable memory device 99, a memory 94, a display 95, and an operator interface 96. The intelligent control 93 may be configured through programming to enhance mass flow sensor calibration. In particular, the intelligent control 93 may be configured to compensate a mass flow sensor's calibration curve for the effects of grain moisture or other grain parameters as will be explained below in further detail.

Figure 5:
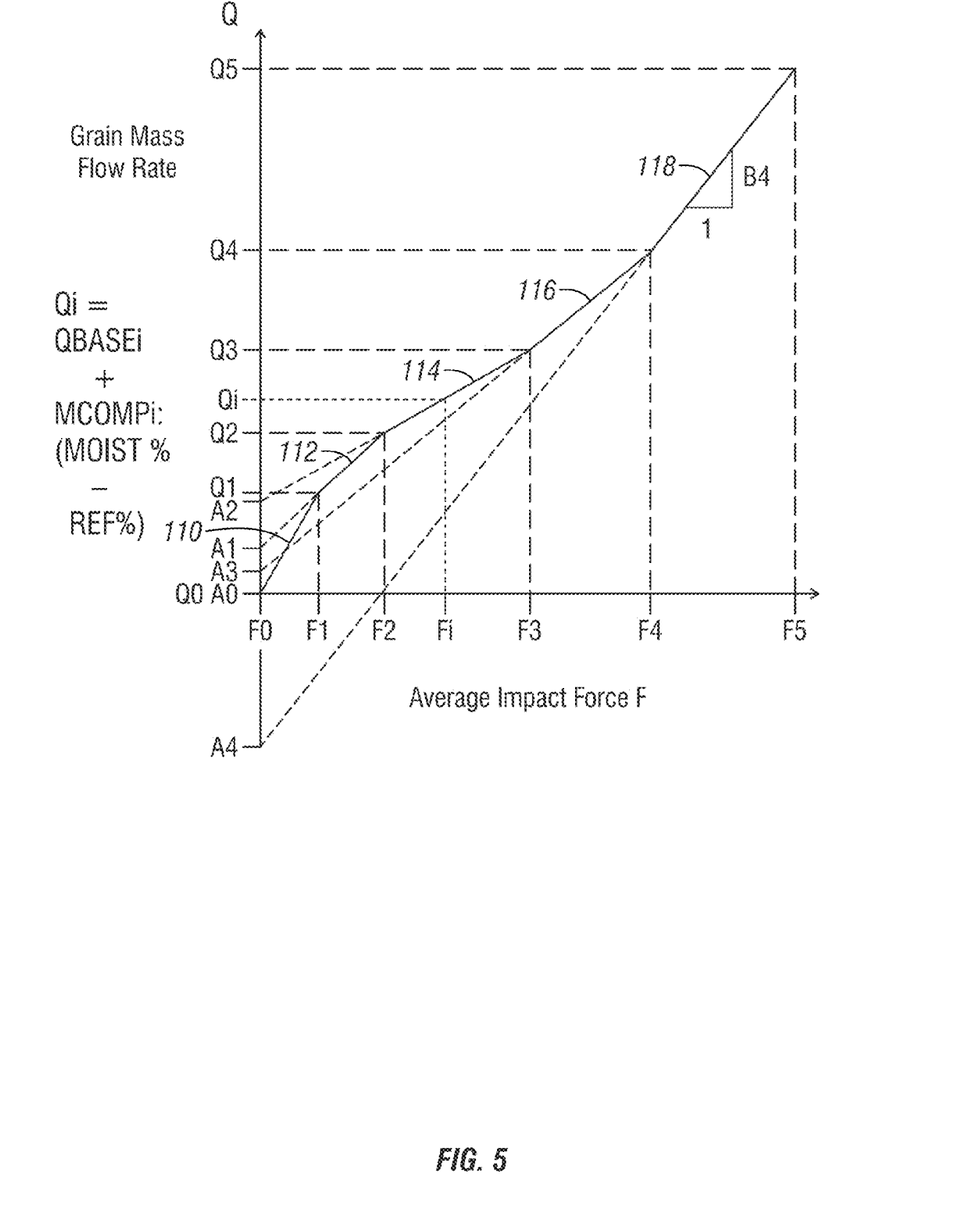
FIG. 5 illustrates one example of a piecewise-linear characteristic curve serving as a calibration curve of a mass flow sensor.

FIG. 5 illustrates one example of a calibration curve for a mass flow sensor. Note that the calibration curve shown is like the calibration curve shown in FIG. 5 of U.S. Pat. No. 5,369,603 (hereby incorporated by reference in its entirety). In particular, the calibration curve of the mass flow sensor is a piecewise-linear characteristic curve. The total mass of a load of grain may be calculated in same manner as Equations (3) through (6b) of U.S. Pat. No. 5,369,603. However, the Q1 through Q5 (hereinafter Qi) values shown here consist of at least two parts, a baseline value that is valid for a fixed reference level of grain moisture, such as 14% water content of the grain; and a moisture compensation value that is proportional to the difference in the measured grain moisture level from a reference moisture level. In equation form:

$$Qi = QBASEi + MCOMPi(MOIST\ \% - REF\ \%)$$

QBASEi is the value of Qi when grain moisture is equal to a fixed value of REF %. MCOMPi is a compensation factor for the effect of actual grain moisture, MOIST %, that differs from REF %. A unique MCOMPi is determined for each Qi value, which corresponds to a fixed average impact force (Fi) value. If the MCOMPi values are properly established, greater accuracy of calculating the total masses of loads of grain with differing grain moisture values will result. The MCOMPi values can be either positive or negative, allowing them to either add or subtract to the QBASEi values in relation to increasing grain moisture. In the above equation, the value used for MOIST % is the average value of grain moisture for the whole load of grain for which mass is being calculated.

It would also be possible to implement a more sophisticated method of compensating for the effect of grain moisture on measured grain mass, by using a unique MOIST % value for each Qi value. Each Qi value would be calculated using a unique Moist % i value as follows:

$$Qi = QBASEi + MCOMPi(MOIST\ \%\ i - REF\ \%)$$

The benefit of this is that there is often a relationship between grain moisture and grain flow that occurs during harvesting, because variable field conditions that cause lower or higher yield can also cause lower or higher grain moisture. This relationship can have either a positive or negative correlation characteristic, meaning that its effect cannot be accurately represented in the adjustment of Qi values based solely on grain mass flow rate (meaning at different Fi values).

One method of determining unique MOIST % i values during harvesting would be to accumulate average moisture values for each Fi level, by averaging moistures that occur in the upper half of the force range below Fi and the lower half of the force range above Fi. In other words, average the instantaneous values of grain moisture that occur in closest proximity to a given Fi value versus the next lowest and next highest Fi values. Next, the process of adjusting the Qi values to obtain the best match between calculated and actual load masses (weights) is extended to include adjusting the MCOMPi values to obtain an even better matching of calculated and actual load weights.

Figure 6:
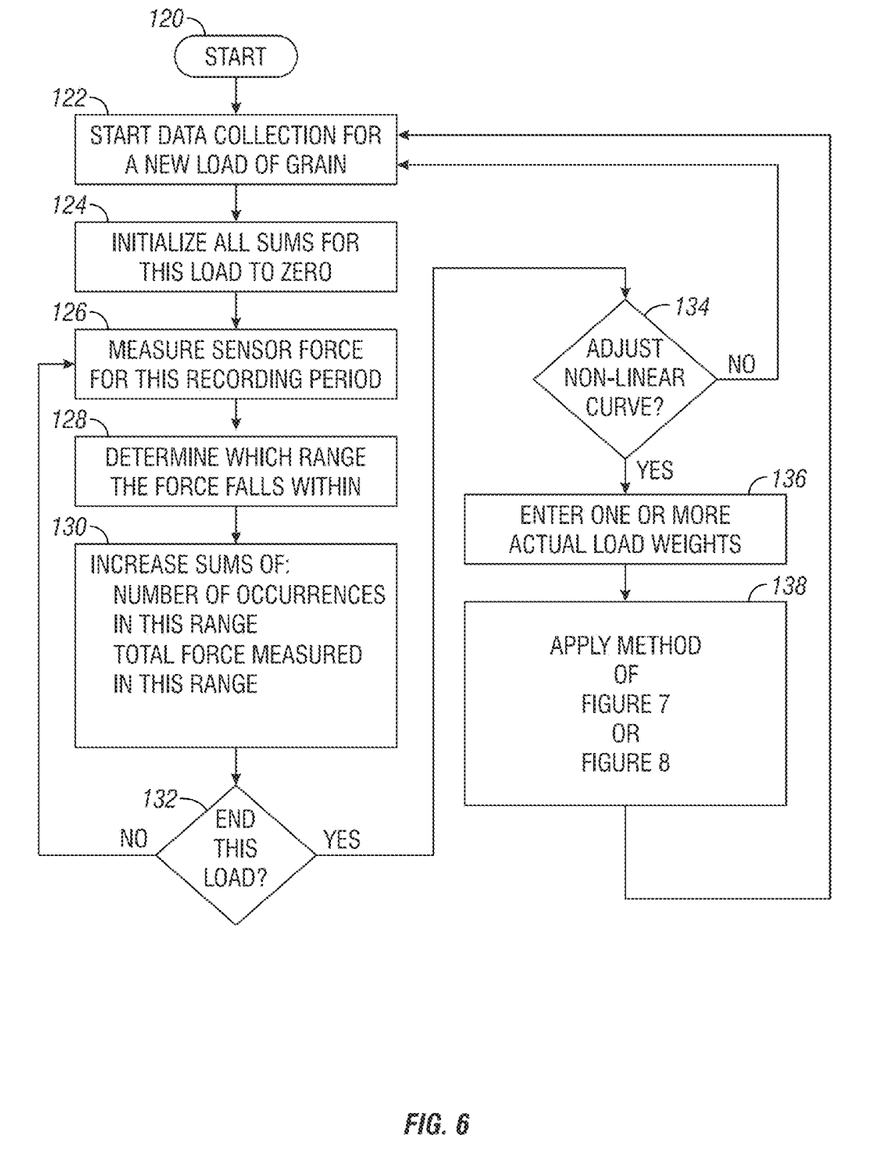
FIG. 6 illustrates one example of a method for enhancing mass flow calibration.
Figure 7:
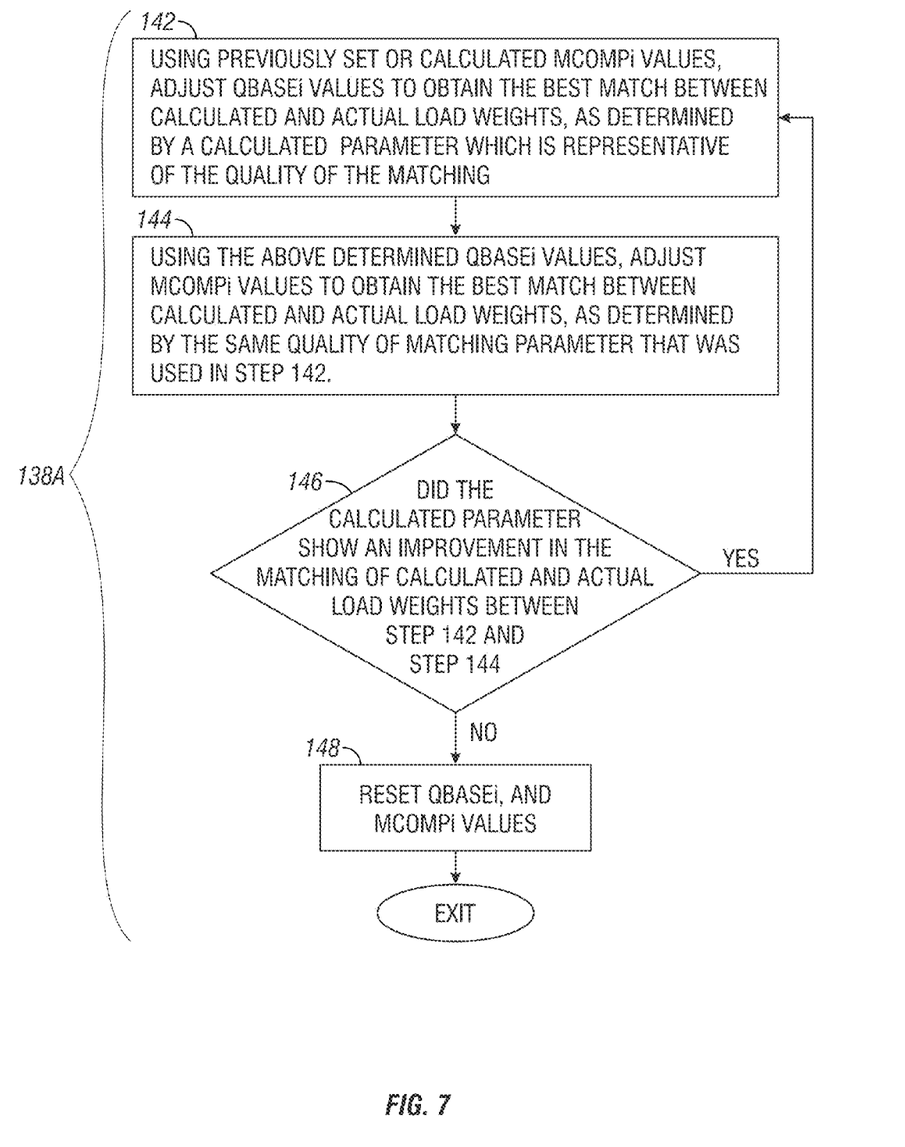
FIG. 7 illustrates a sub-process for enhancing mass flow calibration which better accounts for grain moisture.
Figure 8:
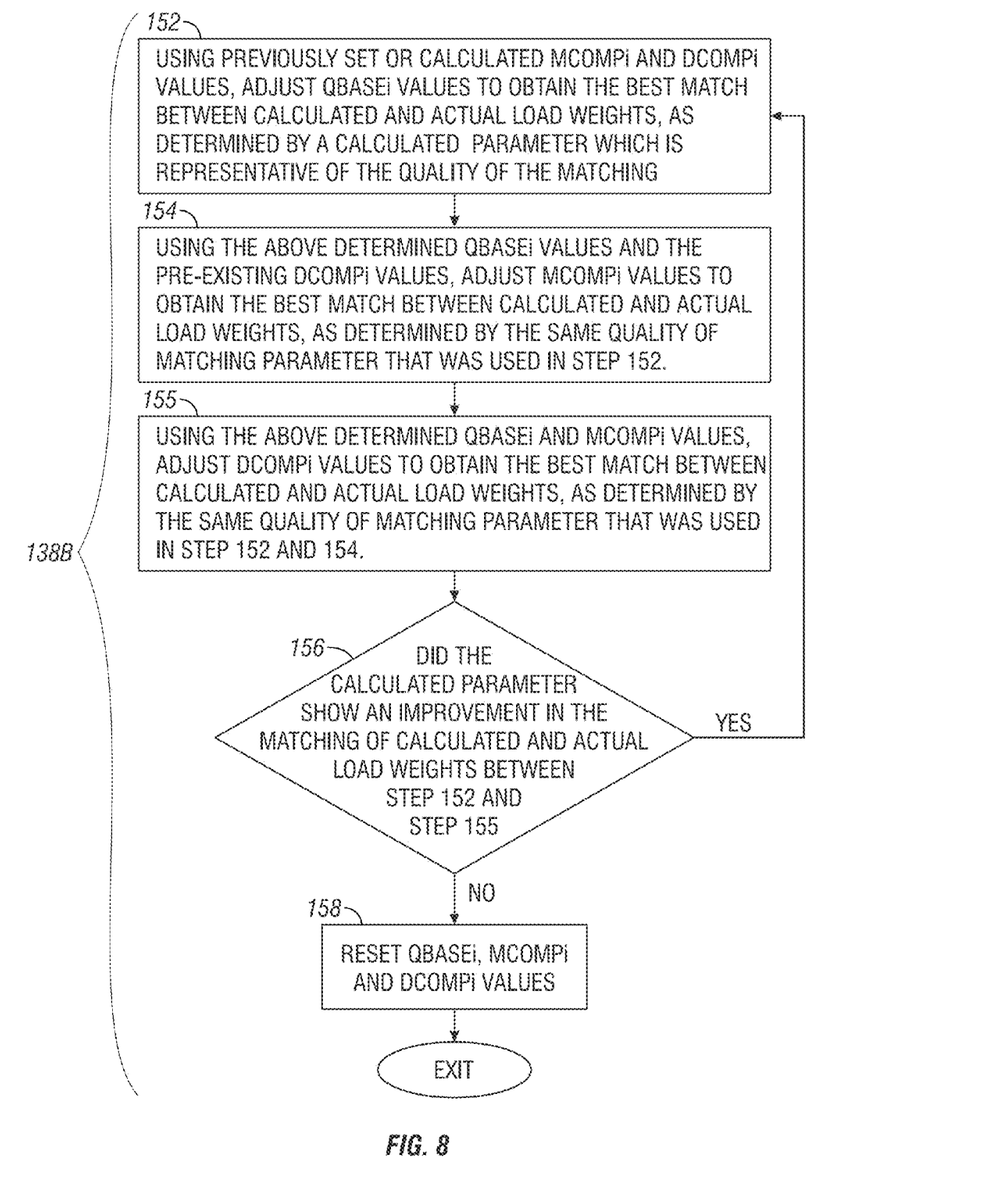
FIG. 8 illustrates a sub-process for enhancing mass flow calibration which better accounts for both grain moisture and grain density.

One example of a methodology of doing so is shown in FIG. 6 and FIG. 7. In FIG. 6, the process begins at step 120. In step 122 data collection for a new load of grain is started. In step 124 all sums for the load are initialized to zero. In step 126 the sensor force is measured for the current recording period. In step 128 a determination is made as to which range the force falls within. In step 130 sums are increased for the number of occurrences in this range and for the total force measured in this range. In step 132 a determination is made as to whether the load has ended or not. If not, the process returns to step 126 to measure the sensor force for the recording period. If in step 132 a determination is made that the load has ended then the process continues to step 134 and a determination is made regarding whether to adjust the non-linear curve. If no, the process continues to step 122 to start data collection for a new load of grain. If in step 134 a determination is made to adjust the non-linear curve, then in step 136 one or more actual load weights may be entered. Then the process continues to sub-process 138 which is performed before starting data collection for a new load. FIG. 7 illustrates one example sub-process 138 in greater detail and FIG. 8 illustrates another example of a sub-process.

As shown in FIG. 7, a sub-process 138A is shown which may be used as the sub-process 138 of FIG. 6. In step 142, using previously set or calculated MCOMPi values, QBASEi values are adjusted to obtain the best match between calculated and actual load weights as determined by a calculated parameter which is representative of the quality of the matching.

Next, in step 144, using the above determined QBASEi values, the MCOMPi values are adjusted to obtain the best match between calculated and actual load weights, as determined by the same quality of matching parameter that was used in the previous step.

In step 146 a determination is made as to whether or not the calculated parameter shows an improvement in the matching of calculated and actual load weights between step 142 and 144. If there is an improvement then the process returns to step 142 using the QBASEi and MCOMPi values determined in steps 142 and 144. If in step 146 there is no improvement then in step 148, the QBASEi and MCOMPi values are reset to those existing before the most recent execution of step 142 and the sub-process is exited. The typical calculated parameter used to indicate the quality of matching between the calculated and actual load weights is the average of the absolute values of the percent error in the calculated weight for a load versus the actual weight for that load. However, other parameters such as standard deviation from a mean error, or maximum error could be used as well. Using any of these parameters, a smaller value indicates a better quality of matching.

In the above described embodiment, the adjustment of the Qi values is linear in relationship to the difference between MOIST % (or MOIST % i) and REF %. However, it is anticipated that any type of non-linear equation could be used to represent the adjustment of Qi relative to grain moisture.

The above described embodiment could also be used with other grain parameters for which values can be measured, assigned by the combine operator, or automatically determined from reference information. Grain parameters such as grain density or kernel size would have values proportional to that parameter, similar to grain moisture.

Kernel shape, crop varieties or hybrids, or observed harvesting conditions may have discrete values rather than continuously variable values. For example, a crop variety would simply have a name that identifies it, and VCOMPi (compensation for crop Variety) values would be determined for that crop variety based on calibration loads which were harvested of that variety. A different variety would have a different name and different VCOMPi values would be determined for it. In this case, a set of VCOMPi values needs to be maintained for every variety which is used for calibration, and used only when calculating load weights for that variety. Since it may be impractical to obtain calibration loads in every crop variety that is harvested, there may also be a set of VCOMPi values that is preset or determined by calibration for a generic variety class, which is any crop for which a specific variety has not been assigned.

It is also possible to simultaneously adjust the Qi values for more than one crop parameter. For example, compensation for both grain moisture and grain density could be obtained by extending the above described embodiment to also compensate for density using a set of DCOMPi (density compensation) values that are adjusted based on the difference between actual crop density versus a reference crop density. In this case, the Qi values would be calculated as follows:

$$Qi = QBASEi + MCOMPi(\text{MOIST \%} - \text{REF \%}) + DCOMPi(\text{DENS} - \text{REFDENS})$$

Where DENS is actual grain density and REFDENS is a fixed reference grain density.

The flow chart for determining the QBASEi, MCOMPi and DCOMPi values is shown as sub-process 138B in FIG. 8. This sub-process 138B may be used as the sub-process 138 of FIG. 6. The process shown in FIG. 8 is similar to the process shown in FIG. 7 except that additional parameters are used to compensate for grain density. In step 152, using previously set or calculated MCOMPi values and DCOMPi values, the QBASEi values are adjusted to obtain the best match between calculated and actual load weights, as determined by a calculated parameter which is representative of the quality of the matching.

Next, in step 154, using the above determined QBASEi values and the pre-existing DCOMPi values, the MCOMPi values are adjusted to obtain the best match between calculated and actual load weights, as determined by the same quality of matching parameter that was used in the previous step.

In step 155, using the above determined QBASEi and MCOMPi values, DCOMPi values are adjusted to obtain the best match between calculated and actual load weights, as determined by the same quality of matching parameter that was used in steps 152 and 154.

In step 156 a determination is made as to whether or not the calculated parameter show an improvement in the matching of calculated and actual load weights between step 152 and 155. If there is an improvement then the process returns to step 152 using the QBASEi and MCOMPi values determined in steps 152 and 154 and the DCOMPi values determined in step 155. If in step 156 there is no improvement then in step 158, the QBASEi , MCOMPi, and DCOMPi values are reset to those existing before the most recently executed step 152 and the sub-process is exited.

It would also be possible to use many other mathematical optimization procedures to determine the QBASEi , MCOMPi and DCOMPi values which obtain the best quality of matching between calculated and actual load weights, For example, it would be possible to simultaneously adjust all values in a single optimization calculation, rather than performing one for each set of parameters to be optimized as shown above.

At this point, it should be readily understandable that it is possible to extend the methods described above to determine Qi compensation factors for any number of grain parameters.

It is to also be understood that information for the compensation factors may come from any number of sources. This includes data which is determined by the grain yield monitor system through sensors, data loaded onto the system such as map data specifying particular hybrids or varieties planted at particular locations, and through information input by the operator through the operator interface or otherwise. Therefore a grain yield monitor system and related apparatus and methods have been shown and described. It is to be understood that although various examples or embodiments are shown and described variations in structure, functionality, and methodology are contemplated and the present invention is not to be limited to the disclosure provided.

What is claimed is:

1. A yield monitor system comprising:
   a grain mass flow sensor;
   an intelligent control operatively connected to the grain mass flow sensor;
   wherein the intelligent control is configured to calibrate the grain mass flow sensor by determining values for a baseline mass flow calibration curve for the grain mass flow sensor by minimizing variation between masses of multiple grain loads as measured by the yield monitor system in comparison to actual load masses;
   further comprising determining compensation values related to a measured, manually input, map-derived, or known physical characteristic of the grain of the grain loads, said compensation values being variable at at least two different points on the baseline calibration curve, and said compensation values adjusted to further minimize the variation between estimated and actual masses of the grain loads.

2. The yield monitor system claim 1 wherein the compensation value is proportional to difference in the measured, manual input, map-derived, or known grain moisture level from a fixed reference level of the physical characteristic of the grain.

3. The yield monitor system of claim 1 wherein the measured level is obtained from a sensor operatively connected to the intelligent control for providing a measured physical characteristic of the grain.

4. The yield monitor system of claim 1 wherein the manually input level is obtained from an operator interface operatively connected to the intelligent control for receiving input from an operator of the yield monitor system of a known physical characteristic of the grain.

5. The yield monitor system of claim 1 wherein the map-derived level is obtained from a map or other stored information source.

6. The yield monitor system of claim 1 wherein the physical grain characteristic comprises one or more of:
   (a) grain moisture;
   (b) grain density;
   (c) grain maturity;
   (d) crop variety or hybrid;
   (e) kernel shape;
   (f) kernel size;
   (g) kernel frictional characteristic.

7. The yield monitor system of claim 1 wherein the physical grain characteristic comprises grain moisture.

8. The yield monitor system of claim 7 wherein the measured level comprises grain, moisture obtained from a grain moisture sensor operatively connected to the intelligent control.

9. The yield monitor system of claim 1 wherein the compensation values are based on one or more additional physical characteristic of the grain.

10. The yield monitor system of claim 9 wherein the one or more additional physical characteristic is related to a measurement which is measured by the yield monitor system.

11. The yield monitor system of claim 10 wherein the one or more additional physical characteristic is input by an operator into the yield monitor system using an operator interface operatively connected to the intelligent control.

12. The yield monitor system of claim 10 wherein the one or more additional physical characteristic is determined by the intelligent control of the yield monitor system based on location within a field.

13. A combine comprising the yield monitor system of claim 1.

14. The yield monitor system of claim 1 wherein the mass flow calibration curve comprises a non-linear characteristic.

15. A yield monitor system comprising:
    a grain mass flow sensor;
    an intelligent control operatively connected to the grain mass flow sensor;
    wherein the intelligent control is configured to calibrate the grain mass flow sensor by:
        using calibration curve variation coefficients to determine how a baseline calibration curve varies as a function of a measured or input grain property value, and
        wherein the variation coefficients are determined by a process that adjusts them to minimize the variation between masses of multiple grain loads, as measured by the grain yield monitor system in comparison to actual load masses.

16. The yield monitor system of claim 15 wherein the mass flow calibration curve comprises a non-linear characteristic.

17. The yield monitor of claim 16 wherein the grain mass flow sensor comprises a force sensor with force values F and the non-linear characteristic comprises a piecewise linear shape with straight segments and transitions between straight segments which compares force values F to mass flow rate values Q.

18. The yield monitor of claim 17 wherein the calibration curve variation coefficients are uniquely determined for discrete points of the mass flow calibration curve at the transitions between straight segments of the piecewise linear shape.

19. The yield monitor of claim 15 wherein the grain property is based on grain moisture.

20. The yield monitor of claim 15 wherein the grain property is based on one or more of:
    (a) grain moisture;
    (b) grain density;
    (c) crop variety or hybrid type;
    (d) grain maturity;
    (e) kernel shape or size; or
    (f) kernel frictional characteristic.

21. The yield monitor of claim 15 wherein the measured or input grain property value is from:
(a) a sensor operatively connected to the yield monitor;
(b) a map accessible by the yield monitor;
(c) information input by an operator of the yield monitor through an operator interface.

22. The yield monitor of claim 15 further comprising determining calibration curve variation coefficients which determine how a baseline calibration curve varies as a function of two or more measured or input grain property values.

23. An apparatus for adjusting the value of mass flow rate of grain in a harvester, comprising:
a mass flow rate sensor which produces an output signal which has a nonlinear relationship to grain mass flow rate;
computing means for calculating an estimated grain mass flow rate by using the said output signal in combination with a non-linear input/output characteristic of a particular shape which relates said output signal to said grain mass flow rate;
wherein said computing means is operable to calculate total masses of grain which are accumulated during finite time periods;
wherein said computing means is operable to utilize separately measured actual masses of grain accumulated during said finite time periods to adjust the shape of said non-linear input/output characteristic to cause said calculated values of said calculated masses of said grain to closely approximately said actual masses; and
wherein said calculation of said time integral is performed utilizing a plurality of data sums which are recorded during measurement of grain mass flow rate during said finite time periods, each of said data sums corresponding to a separate one of a plurality of ranges of said output signal of said sensor;
further comprising determining compensation values related to a measured, manually input, map-derived, or known physical characteristic of the grain of the grain loads, said compensation values being variable at least two different points on the non-linear input/output characteristic, and said compensation values adjusted to further minimize the variation between estimated and actual masses of the grain loads.

24. The apparatus of claim 23 wherein said non-linear input/output characteristic of said sensor is approximated by a plurality of straight line segments corresponding to said plurality of said ranges of said output signal.

25. The apparatus of claim 23 wherein said data sums comprise totals of occurrences of said output signal and totals of the values of said output signal which occur in each of said ranges of said output signal.

26. The apparatus of claim 23 wherein the physical characteristic of grain comprises grain moisture.

27. The apparatus of claim 23 wherein the physical characteristic of grain is based on one or more of:
(a) grain moisture;
(b) grain density;
(c) crop variety or hybrid type;
(d) grain maturity;
(e) kernel shape or size; or
(f) kernel frictional characteristic.

28. The yield monitor of claim 14 wherein the grain mass flow sensor comprises a force sensor with force values F and the non-linear characteristic comprises a piecewise linear shape with straight segments and transitions between straight segments which compares force values F to mass flow rate values Q.

29. The yield monitor of claim 28 wherein the calibration curve variation coefficients are uniquely determined for discrete points of the mass flow calibration curve at the transitions between straight segments of the piecewise linear shape.

* * * * *